April 2, 1940.   J. VON BRETHORST   2,195,473
WHEEL BALANCING WEIGHT
Filed Feb. 24, 1937
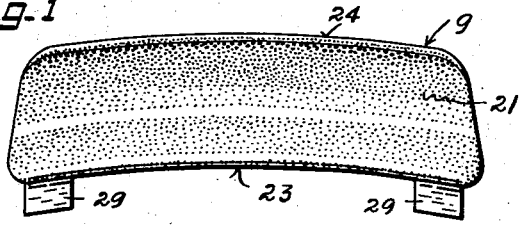
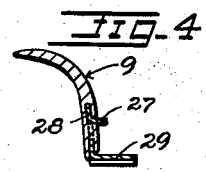
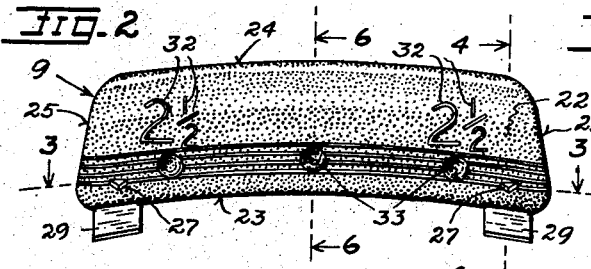
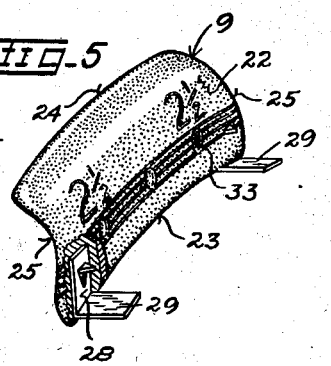
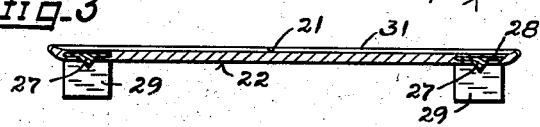
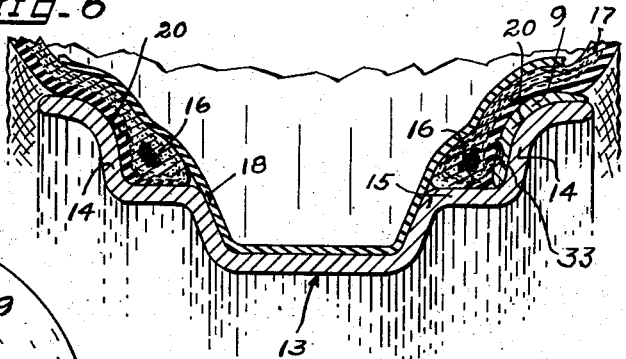
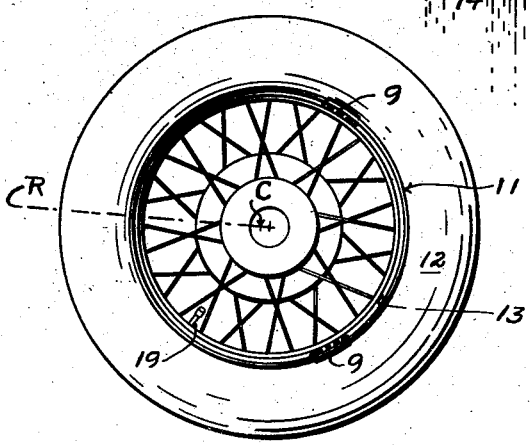
INVENTOR.
JOERGEN VON BRETHORST
BY Henry N. Young.
ATTORNEY Patented Apr. 2, 1940

2,195,473

UNITED STATES PATENT OFFICE 2,195,473

WHEEL BALANCING WEIGHT

Joergen Von Brethorst, Oakland, Calif.

Application February 24, 1937, Serial No. 127,413

7 Claims. (Cl. 301—5)

The invention relates to a weight for installation to balance a vehicle wheel which removably and replaceably carries a pneumatic tire.

An object of the invention is to provide a balancing weight which does not protrude from the wheel or tire when it is operatively installed, and is generally concealed in its mounted position.

Another object of the invention is to provide a concealed weight of the class described which is structurally independent of the wheel and tire whereby no limitation is placed upon its adjusted installation with respect to the wheel and tire.

A further object is to provide a balancing weight of the class described such that it may be secured in operative position solely by reason of its engagement between the inflated tire and the wheel rim which mounts the tire.

Yet another object is to provide a balancing weight which engages and is engaged by the tire in such a manner that the weight maintains a fixed relation to the tire on the wheel.

The invention possesses other objects and features of advantage, some of which, with the foregoing, will be set forth or be apparent in the following description of a typical embodiment thereof, and in the accompanying drawing, in which, Figure 1 is a side face view of a wheel balancing weight embodying the features of the present invention, the rim-engaging face of the weight being shown.

Figure 2 is a view of the tire-engaging face of the weight.

Figures 3 and 4 are sections respectively taken at the lines 3—3 and 4—4 in Figure 2.

Figure 5 is a perspective view of the weight, a portion of the weight structure being broken out to disclose an anchoring member thereof.

Figure 6 is a fragmentary cross-sectional view through a wheel rim and mounted tire and installed balance weight, the weight section being taken at the line 6—6 in Figure 2.

Figure 7 is a side view of a wheel and tire assembly having a pair of the present weights operatively mounted thereon.

In vehicle wheels carrying pneumatic tires, it is highly desirable that the center of mass be located in the axis of rotation of the wheel whereby the assembly may be dynamically balanced. In the manufacture of both wheels and tires, some variation in the distribution of weight thereof is inevitable whereby symmetry of structure is not usually sufficient to insure a truly balanced condition of the wheel and tire assembly. In practice, it has been found that tires vary more in weight distribution than do wheels whereby the center of mass of a tire is not always in a line from the tire axis to the valve-stem structure as is frequently assumed. It is therefore desirable to balance each specific wheel and tire assembly as a unit by the use of one or more counterbalance weights which may be fixed in appropriate position on the assembly after the required mass of and location for the weights has been determined by an appropriate testing device, and the present weights have been specifically designed to accomplish the aforesaid and related purposes in a particularly advantageous manner.

For purposes of illustration, a balance weight 9 is shown in Figures 6 and 7 as being operatively associated with a wheel 11 which mounts a tire 12. The wheel 11 is provided with a rim 13 having a channel defined in its outer periphery between usual side flanges 14 extending from a connecting tubular portion 15 which is cooperative with the flanges to define the bottoms and outer sides of annular seats for complementarily engaging the circumferentially unyielding bead portions 16 of a usual tire casing 17.

The casing 17 encloses an inflatable inner tube 18 for expanding the tire casing to maintain its tread portion in spaced relation from the rim as a resilient support means for the vehicle carried on the wheel. The tube 18 is provided with a usual valve-stem assembly 19 which is arranged to extend inwardly from the tube and through the rim. As is usual, the inflated tube 18 will engage flat against the inner casing wall and the rim portion between the casing beads 16, and is operative to thrust the tire beads 16 axially outwardly in the rim seats provided for them whereby the beads are forcibly pressed against the complementary inner faces 20 of the rim sides at all times.

It will now be noted that the weight 9 has been specifically designed for insertion in its substantial entirety between the tire bead 16 and an opposed rim side for fixed disposal in its mounted position on the wheel and tire assembly by reason of its pressure engagement between the bead and rim. An outer face 21 of the weight 9 is preferably smooth and is arranged for flat engagement against the face 20 of the opposed and relatively unyielding rim flange 14.

The inner face 22 of the weight 9 is arranged to engage against the opposed tire bead face in such a manner that the weight is held to the tire bead in fixed relation thereto for movement therewith; this relation of the weight and tire is particularly desirable because an inherently unbalanced tire may shift circumferentially on the rim and so shift the center of mass of the wheel and tire assembly unless the weight shifts with the tire. Also, the mounted weight 9 lies substantially entirely within the lateral profile of the wheel rim and tire thereat whereby no weight part protrudes for contact with objects adjacent the wheel or for the accumulation of mud or the like thereat to destroy the balanced wheel condition provided by the application of the weight.

The weight faces 21 and 22 join at an inner longitudinal edge 23, an outer edge 24, and end edges 25, all of which edges preferably taper from the boundary line of the outer weight face 21 whereby to avoid a cutting of the transversely yielding and bendable tire bead 16 by reason of its pressure engagement over the inserted weight. The weight member 9 is preferably of substantially uniform thickness within its tapered boundary portions and is so thin as to not unduly strain the distorted bead structure opposite it. Weights 9 may have different lengths to provide different masses therefor, the width of the weights between the edges 23 and 24 being determined by the width of the rim flange against which the weight is to be applied. The weight edges 23 and 24 are, of course, curved to correspond with the curvature of the flange portions thereat circumferentially of the wheel, and the weight faces 21 and 22 are understood to be torically curved in conformity with the opposed flange and bead faces.

It will now be noted that the weight edge 24 is somewhat shorter than the edge 23 whereby the weight ends at the edges 25 are angularly related to the mutually parallel edges 23 and 24. The relation of the weight edges is preferably such that the weight side faces 21 and 22 have the general outlines of like equilateral trapezoids, as is particularly evident in Figures 1 and 2. This formal feature of the present weight results in a positive resistance by the tire bead to a radially outward shifting of the weight engaged by it by reason of the inward pressure component which is created against the sloping ends of the weight, whereby the bead is constantly reactive with the weight to urge it toward and against the rim portion 15 and so prevent an outward movement of the weight from within the rim. Also, if any shifting of the weight is urged circumferentially of the tire, the weight is only pressed inwardly while the opposed end of the recess formed about it in the bead positively resists such longitudinal shifting.

As a further means for securing a weight 9 in its set position between the tire and rim, and for circumferential movement with the tire rather than with the rim, one or more burr or barb members 27 may be provided on the weight to extend transversely into the bead, preferably at a point near the inner weight edge 22. The barbs 27 would be sharpened for piercing the tire bead thereat, and would be operative to resist any lateral shift of the weight over the bead surface engaged by it. The barbs 27 are also useful to positively mark the position of a set weight to provide for its reinstallment in its appointed place without necessitating a rebalancing of the wheel following a removal of the tire and its replacement on the wheel. Said barbs may be homogeneous with the weight material if the latter is not too soft; in the present instance, the weight proper is assumed to be made of a lead or other heavy metallic and relatively soft material, and extends integrally from a base plate 28 which is embedded within the weight structure in the general plane thereof.

Ears 29 extend inwardly from the weight edge 23 transversely of the weight for disposal between the inner bead face and the rim portion 15 as a means to positively secure the weight inwardly against the rim portion 15. As shown, the ears 29 comprise transverse extensions of the plates 28 from which the barbs 27 extend, and the barbs comprise struck-out portions of said plates. In this manner, a barb 27 and an ear 29 are provided in a single element which is secured to the weight member by embedment of the plate 28 therein, the plate opening from which the barb material is removed receiving the weight material for keying the assembly in position. While two ears 29 are shown for the weight 9, it will be understood that a single ear might be provided in lieu thereof and centrally of the weight edge 23 to have any desired length longitudinally of the weight.

Longitudinal ribs 31 are provided on the face 22 of the weight for embedment in the opposed tire bead face as a further means to secure the weight against an outward lateral shifting with respect to the rim. Striations or ribs may also be provided across the weight and on the face 22 thereof for aiding in securing the weight against its longitudinal shifting with respect to the tire bead; as shown, the numerals 32 which indicate the weight mass, comprise embossments which extend across the face 22 and would function for the latter purpose.

Also, shallow recesses or sockets 33 may be provided in the face 22 for receiving tire bead portions which are pressed thereinto by reason of the tire pressure behind the opposed bead face.

A preferred operative application of a pair of the present weights 9 is illustrated in Figure 7. Assuming that the center of mass of the unbalanced wheel and tire assembly lies in the radial line R at the point C thereof, weights 9 are disposed opposite rim points which are approximately one hundred twenty degrees from the line R until an approximate balance is secured, weights of different mass being provided for permitting this relation. The chosen weights are, if necessary, shifted circumferentially along the rim until an exact balance is found, and are then inserted between the rim and bead for their fixed mounting in their appointed places.

From the preceding description, it will be understood that the operative installation of a present weight provides an inconspicuous and nonprotruding mounting for such a weight. Also, the weight may be made of a relatively soft material for any required deformation for its initial conformation to the rim and tire faces which engage it by reason of its enclosure between the rim and tire bead to both shape and protect it. Furthermore, if any circumferential shifting of the tire occurs, the weight will follow the tire, its relatively smooth face 21 sliding freely along the inner flange face 20; in this manner, the balance of the tire as such will not be disturbed.

From the foregoing description taken in connection with the accompanying drawing, the advantages of the construction and method of use will be readily understood by those skilled in the art to which this invention appertains. While I have described the features and principles of operation of a structure which I now consider to be a preferred embodiment of my invention, I desire to have it understood that the showing is primarily illustrative, and that such changes may be made, when desired, as fall within the scope of the following claims.

I claim:

1. A weight for the balancing of pneumatic-tired vehicle wheels, comprising a body formed for the insertion of a major portion by mass thereof between the tire-receiving rim of a wheel and the tire portion which normally engages the rim thereat.

2. A weight for the balancing of pneumatic-tired vehicle wheels, comprising a relatively thin body arranged for insertion in its entirety between the side flange of the tire-receiving rim of a wheel and the tire portion which normally engages the flange thereat, said body having the opposite side faces thereof curved in complementary relation to the opposed tire and flange surfaces.

3. In combination, a vehicle wheel comprising a rim providing a tire-receiving channel defined between side flange portions of the rim, a pneumatic tire mounted circumferentially upon said rim, and a wheel balancing weight removably and compressedly engaged between a rim flange and the tire to lie entirely between mutually opposed rim and tire face portions.

4. A weight for the balancing of pneumatic-tired vehicle wheels, comprising a body arranged to have at least the major portion of its mass engaged between the tire-receiving rim of a wheel and the tire portion which normally engages the rim thereat, and means on the body for coaction with the said tire portion to secure the mounted weight against lateral movement with respect to the tire.

5. In combination, a vehicle wheel having a rim providing a tire-receiving channel defined between radially extending side flange portions of the rim, a pneumatic tire mounted upon said rim and having bead portions thereof complementarily engaging the inner faces of said flanges, a wheel-balancing weight removably and fittedly engaged between a rim flange and a said tire bead portion, and an ear extending transversely from the tire-engaging face of the weight and between the channel bottom and the said tire bead portion.

6. In combination, a vehicle wheel having a rim providing a tire-receiving channel defined between radially extending side flanges of the rim, a pneumatic tire mounted upon said rim and having bead portions thereof complementarily engaging the inner faces of said flanges, a unitary wheel-balancing weight removably and fittedly engaged between a rim flange and an opposed tire bead, and means fixed on said weight directly cooperative with the tire to prevent its lateral movement from its mounted position with respect to the tire and comprising a barb engaging in the opposed tire bead portion and an ear disposed against the inner side of the bead, said barb and ear extending from a common member embedded in the weight.

7. In combination, a vehicle wheel having a rim providing a tire-receiving channel, a pneumatic tire mounted upon said rim and having bead portions thereof complementarily engaging the inner faces of the channel sides, a unitary wheel-balancing weight removably and fittedly engaged between a channel side and an opposed tire bead, and means fixed on said weight directly cooperative with the tire to prevent its lateral movement from its mounted position with respect to the tire and comprising a projection extending into the opposed tire bead portion and an ear disposed within the inner periphery of the bead, said projection and ear extending from a common element of the weight.

JOERGEN VON BRETHORST.